United States Patent [19]

Estes et al.

[11] Patent Number: 4,854,662

[45] Date of Patent: Aug. 8, 1989

[54] OPTICAL DATA SIGNAL APPARATUS FOR OPTICALLY COUPLING A PLURALITY OF DATA CHANNELS BETWEEN STATIONARY AND ROTATING SYSTEMS

[75] Inventors: Marvin F. Estes, Oakfield; Arnold W. Lungershausen, West Henrietta, both of N.Y.

[73] Assignee: Eastman Kodak Company, Rochester, N.J.

[21] Appl. No.: 249,820

[22] Filed: Sep. 27, 1988

[51] Int. Cl.[4] .............................................. G02B 6/36
[52] U.S. Cl. ......................... 350/96.20; 350/96.15; 350/96.18; 350/162.16; 250/227; 372/108
[58] Field of Search ............... 350/96.20, 96.15, 96.18, 350/96.21, 96.22, 162.16; 250/227; 372/108

[56] References Cited

U.S. PATENT DOCUMENTS

| | | | |
|---|---|---|---|
| 3,577,094 | 5/1971 | Tomlinson et al. | 372/108 |
| 4,109,997 | 8/1978 | Iverson | 350/96.15 |
| 4,109,998 | 8/1978 | Iverson | 350/23 |
| 4,258,976 | 3/1981 | Scott et al. | 350/96.20 |
| 4,278,323 | 7/1981 | Waldman | 350/96.20 |
| 4,389,791 | 8/1983 | Dorsey | 350/96.18 |
| 4,401,360 | 8/1983 | Streckmann et al. | 350/96.15 |
| 4,436,367 | 3/1984 | Lewis et al. | 350/96.20 |
| 4,444,459 | 4/1984 | Woodwell | 350/96.15 |
| 4,447,114 | 5/1984 | Koene | 350/96.20 |
| 4,460,242 | 7/1984 | Birch et al. | 250/227 |
| 4,466,695 | 8/1984 | Kruger | 250/227 |
| 4,472,052 | 9/1984 | Löfgren | 250/227 |
| 4,492,427 | 1/1985 | Lewis et al. | 350/96.20 |
| 4,511,934 | 4/1985 | Ohira et al. | 360/55 |
| 4,519,670 | 5/1985 | Spinner et al. | 350/96.15 |
| 4,550,985 | 11/1985 | Hayashi | 350/96.20 |
| 4,650,277 | 3/1987 | Husher et al. | 350/96.20 |
| 4,749,249 | 6/1988 | Hockaday et al. | 250/227 |
| 4,767,175 | 8/1988 | Böhner et al. | 350/96.20 |

FOREIGN PATENT DOCUMENTS 53-21912  2/1978  Japan .

OTHER PUBLICATIONS

"Fresnel Lenses as Fiber-Optic Demultiplexers"; Electro Optical System Design, vol. 12, No. 6; 06/1980.

*Primary Examiner*—William L. Sikes
*Assistant Examiner*—Xuân Thi Vo
*Attorney, Agent, or Firm*—William F. Noval

[57] ABSTRACT

Disclosed is optical data signal apparatus for optically coupling a plurality of data channels between stationary and rotating systems. The optical data signal apparatus is useful in a rotary head scanner for coupling a plurality of data channels between a rotating head wheel, having a plurality of magnetic record/reproduce heads, and stationary signal processing circuitry. Each data channel of the apparatus includes an optical data signal transmitter, an optical data signal receiver and an optical coupling element for causing an optical data signal transmitted by the transmitter to be focused on the receiver. The plurality of optical coupling elements are preferably annular and arranged concentrically in a plane. Each optical coupling element focuses the optical data from a transmitter to a respective receiver which is positioned off axis with respect to the central axis of the concentric optical elements. Preferably the optical elements are holographic optical elements.

8 Claims, 4 Drawing Sheets

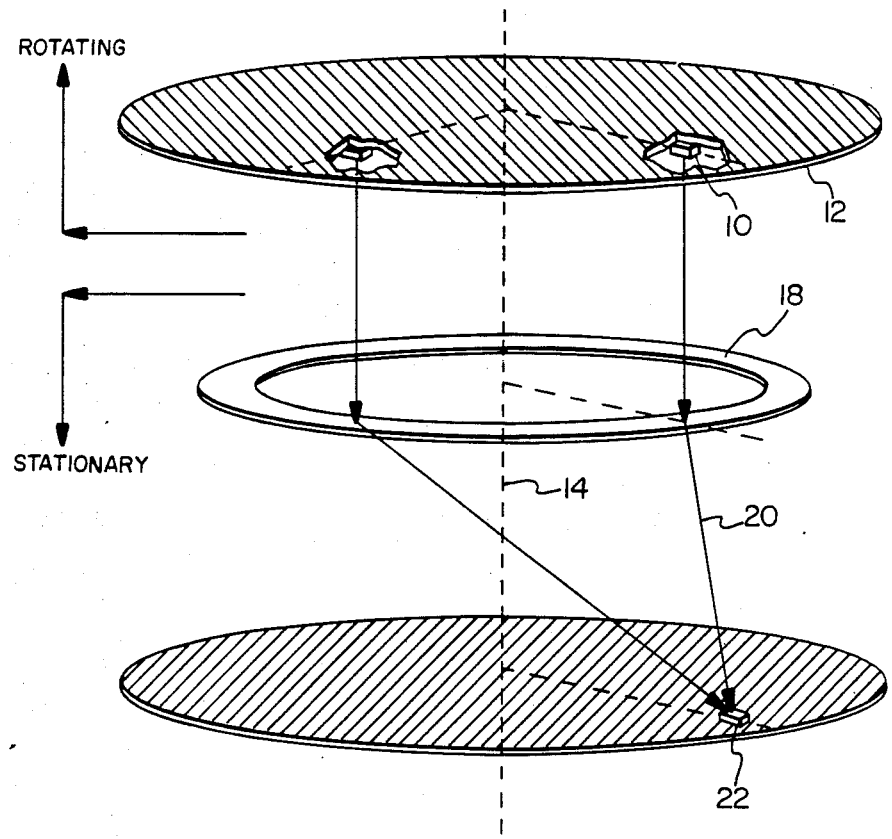
FIG. IA

OPTICAL DATA SIGNAL APPARATUS FOR OPTICALLY COUPLING A PLURALITY OF DATA CHANNELS BETWEEN STATIONARY AND ROTATING SYSTEMS

CROSS-REFERENCE TO A RELATED APPLICATION

Reference is made to commonly assigned, copending U.S. application Ser. No. 249,819; filed Sept. 27, 1988; entitled "Fresnel Lens Apparatus For Optically Coupling A Plurality of Data Channels"; Inventors M. F. Estes and A. W. Lungershausen.

BACKGROUND OF THE INVENTION

This invention relates in general to apparatus for coupling data between stationary and rotary systems. More particularly, this invention relates to apparatus for optically coupling a plurality of data channels between the rotating and stationary structure of the rotary head scanner of a magnetic tape recorder.

Advanced magnetic tape recording and reproducing systems require ever higher data transfer rates and increased bandwidths. In helical scan magnetic tape recorders using rotary head scanners, there must be some means for transmitting signals between the rapidly rotating head wheels upon which the recording and reproducing heads are mounted and stationary signal processing circuitry. Typically, rotary transformers are used to transmit both the record and reproduce signals from and to the magnetic heads carried by the rotating head wheel. Rotary transformers, however, have a predicted upper frequency limit of approximately 150 megahertz. Moreover, at such high signal frequencies, dimensional tolerances between the stationary and rotary coils of the rotary transformer are severe and cross talk between adjacent rotary transformers is difficult to eliminate.

In order to mitigate the disadvantages of rotary transformers, several proposals have been made to optically transmit signals between the stationary and rotating structure of a rotary head scanner. Optical transmission has an upper frequency limit of six gigahartz at the present time, with an unknown limit in the future. Moreover, crosstalk between record and reproduce signals and crosstalk between adjacent channels is virtually eliminated and dimensional tolerances are less severe. Where only one or two signals (for example, record and reproduce signals) are to be optically transmitted between the rotating and stationary structure of a rotary head scanner, the simplest technique is to have the optical signal transmission axis coincide with the axis of rotation of the head wheel or to have, at least either the optical signal transmitter or receiver coincident with the axis of rotation of the rotating head wheel. Such a technique is disclosed, for example, in Japanese Kokai Patent No. 53-21912, published Feb. 28, 1978, Inventors, Koshimoto et al.; in U.S. Pat. No. 4,401,360, issued Aug. 30, 1983, Inventors Streckmann et al.; and in U.S. Pat. No. 4,511,934, issued Apr. 16, 1985, Inventors Ohira et al. The arrangements disclosed in these patents are generally not easily adaptable to the transmission of multiple optical signals over separate optical paths. In order to minimize interference between the signals, either a half mirror or filter is used to separate two optical signals transmitted over the same optical axis which coincides with the axis of rotation of the head wheel.

Although multiplexing techniques (for example, time division multiplexing, frequency division multiplexing or wavelength division multiplexing) may be used to optically transmit multiple signals along the same optical axis, the circuitry required to multiplex and demultiplex such signals is complex and costly and susceptible to crosstalk and signal degradation. Thus, it is desirable to optically transmit each signal along a separate optical path in order to minimize such difficulties. Several techniques have been proposed for providing optical transmission between a first array of optical elements mounted on a rotating body and a second complementary array of optical elements mounted on a stationary or rotating body. Thus, in U.S. Pat. No. 4,447,114, issued May 8, 1984, Inventor Koene, there is disclosed an optical coupling body which is disposed between first and second arrays of optical conductors mounted for rotation at equal but opposite rates relative to the optical coupling body. Either light reflective or light transmissive means is arranged in the body to effect constant coupling of individual conductors in the first array with respective conductors in the second array. A similar technique is disclosed in U.S. Pat. No. 4,109,998, issued Aug. 29, 1978, Inventor Iverson and U.S. Pat. No. 4,258,976 issued Mar. 31, 1981, Inventors Scott et al. As disclosed, a derotation assembly is located between a stationary body and a rotating body having respective complementary arrays of optical transmitting and optical receiving elements. The derotation plate is rotated at half the speed of the rotating body. The optical transmission arrangements of the latter three patents are disadvantageous because of mechanical and electrical complexity, cost, and unreliability.

U.S. Pat. No. 4,519,670, issued May 28, 1985, Inventors Spinner et al., discloses a light rotation coupling for the transmission of a plurality of light channels between two parts which rotate relative to each other. A plurality of radially arrayed light transmitters rotate about an axis which coincides with the optical axis of a multiple refractive or reflective light transmitting optical assembly. A plurality of light receivers are axially arrayed along the optical/rotation axis. This technique is disadvantageous because of the use of complex, expensive and heavy optical transmission assemblies. Moreover, locating the light receivers on the axis of rotation is disadvantageous for several reasons. First, the coupling system is bulky and not suitable for applications where space is at a premium. Moreover, bidirectional transmission of data is difficult because the optical data channels are interfered with by the electrical conductors and hardware associated with the other optical data receivers. Thus, data cannot be transmitted at all times.

In another proposed optical signal transmission technique, individual optical slip rings are stacked along the axis of rotation of a moving body. Thus, U.S. Pat. No. 4,278,323, issued July 14, 1981, Inventor Waldman, discloses an optical signal transmission system which includes a plurality of axially spaced optical fiber rings rotatably mounted on a spindle. The rings are mounted in a fixed casing having a number of separate chambers corresponding to the number of optical fiber rings. Fixed fiber optic blocks surround each fiber optic ring. Complementary LEDs and photodiodes are respectively embedded in each optic fiber ring and block to effect optical signal transmission between the stationary optic fiber block and the rotating optical fiber ring. In U.S. Pat. No. ∝,444,459, issued Apr. 24, 1984, Inventor Woodwell, a fiber optic slip ring comprises a toroidal optic wave guide which is uncoated along a circumferential window extending along the inner or outer circumference of the wave guide. An electronic device for transmitting an optical signal is connected to one end of the wave guide. A ring of radiation is produced so that an optical signal receiver may be positioned at any location around the circumference of the wave guide to receive the transmitted optical signal. As disclosed in the latter patent, a plurality of slip rings may be arrayed along the rotational axis of the receiver in order to effect transmission of a plurality of separate optical signals. The optical slip ring systems of the latter two patents are disadvantageous, among other reasons, because of the inefficiency in producing a 360° ring of radiation.

SUMMARY OF THE INVENTION

According to the present invention, there is provided optical data signal apparatus which obviates the disadvantages of the prior art. According to an aspect of the present invention, a plurality of optical data signals may be coupled between stationary and rotating members by means of an optical coupling assembly which is simple, light-weight and inexpensive. Moreover, crosstalk between coupled optical data signals is substantially minimized.

According to an aspect of the invention, an optical data signal apparatus includes an optical data signal transmitter and an optical data signal receiver which are rotatable with respect to one another about a rotational axis. The receiver and the transmitter are both spaced from the rotational axis. The apparatus includes an optical coupling element which has a central axis coincident with the rotational axis. Preferably the optical coupling element is an annular, substantially planar element. The optical coupling element causes a collimated optical data signal, transmitted by said transmitter along a path (preferably perpendicular) to said optical element, to be focused along a path to said receiver. According to an aspect of the present invention, the optical coupling element is a holographic optical element.

According to another aspect of the present invention, the optical data signal receiver is stationary, the optical data signal transmitter rotates about a rotational axis relative to said stationary receiver, and the optical coupling element is stationary and causes an optical data signal transmitted by said rotating transmitter to be focused to said stationary receiver.

According to a further aspect of the present invention, the optical data signal transmitter is stationary, the optical data signal receiver rotates about a rotational axis relative to said transmitter, and the optical coupling element rotates about the rotational axis in synchronism with the receiver and causes an optical data signal transmitted by the stationary transmitter to be focused to the rotating receiver.

According to still another aspect of the present invention, a plurality of optical data signals are transmitted and received between stationary and rotating members which may comprise the stationary and rotating components of a rotary magnetic head scanner of a helical magnetic tape recorder.

BRIEF DESCRIPTION OF THE DRAWINGS

In the detailed description of a preferred embodiment of the invention presented below, reference is made to the accompanying drawings in which like elements are numbered with like numbers.

FIGS. 1A and 1B are diagrammatic perspective views useful in explaining the present invention.

DETAILED DESCRIPTION OF THE PREFERRED EMBODIMENT

Figure 1B:
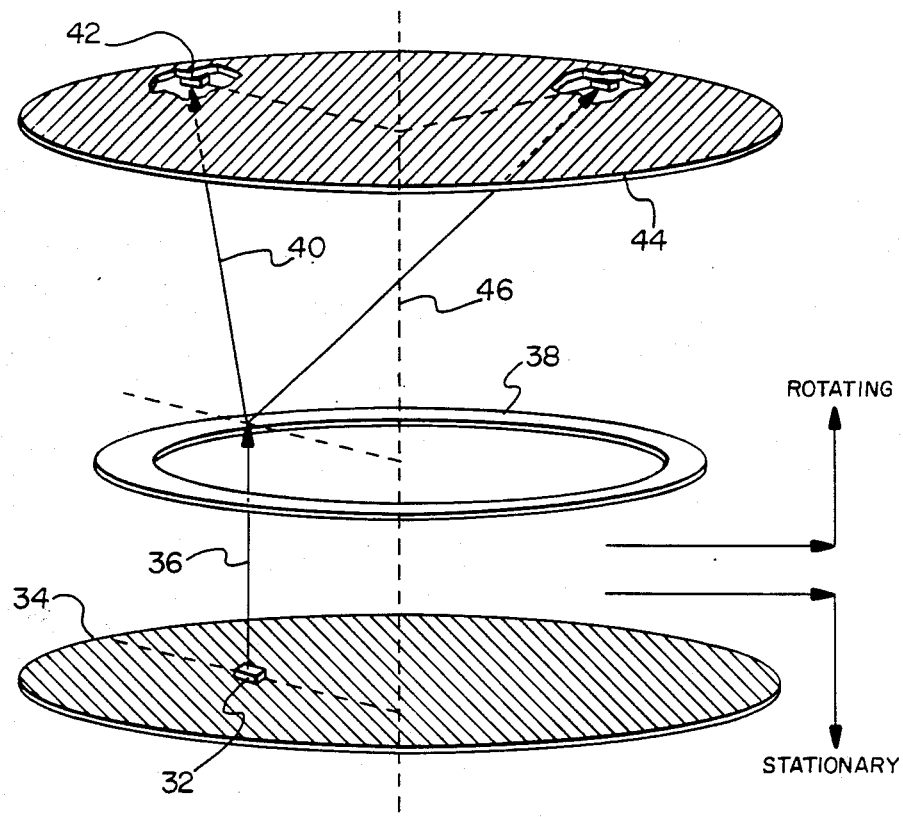

In the following description of preferred embodiments of the present invention, specific application will be described relating to rotary head scanners in helical scan magnetic tape recording/reproducing apparatus. It will be understood, however, that the present invention may be used in any application where data signals are to be optically coupled between a rotating body and a stationary body. Other such applications include, for example, coupling of optical data signals between rotating signal processing equipment and stationary signal processing equipment, such as in radar equipment or the like.

Referring now to FIG. 1A, there is shown a diagrammatic perspective view illustrating a general embodiment of the present invention. As shown, an optical data signal transmitter 10 mounted on member 12 rotates about rotational axis 14. Transmitter 10 (which may, for example, be a laser diode) transmits a collimated optical data signal along a path which is perpendicular to an optical coupling element 18. Optical coupling element 18 comprises an annular, substantially planar, optical element such as an holographic optical element. Optical coupling element 18 is stationary and causes the collimated data signal to be focused along a path 20 to optical data signal receiver 22 which is spaced from rotational axis 14. Receiver 22 may, for example, be a photodiode or the like.

Optical coupling element 18 has a central axis which is coincident with rotational axis 14. Element 18 is dimensioned to be coextensive with the circular path of radiation transmitted by transmitter 10, in completing a revolution about axis 14. Element 18 has a width which is determined by the size of the beam of optical signal transmitted by transmitter 10. The optical characteristics of optical coupling element 18 are such as to focus radiation which is perpendicular to element 18 at any point around its length to a single point which is off of the rotational axis 14. The optical data signal receiver is placed at this point in space.

Figure 6:
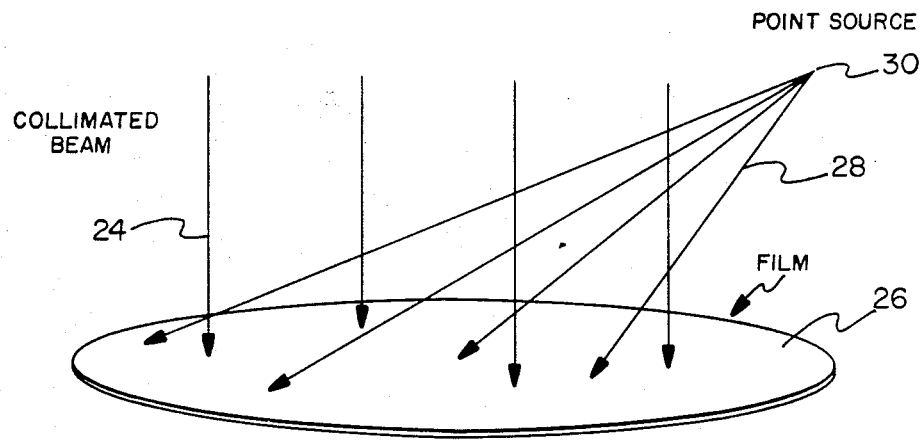
FIG. 6 is a diagrammatic perspective view of a technique for making a holographic optical element for use in the present invention.

Optical coupling element 18 is preferably a holographic optical element which may be made according to the technique illustrated in FIG. 6. As shown, a collimated beam of radiation 24 impinges perpendicularly onto a piece 26 of light-sensitive media while another beam of radiation 28 from a point source 30 also impinges on the media in the same region. Media 26 is then developed to produce a holographic optical element. Techniques of computer generated hologram may also be applied here. The element causes a beam directed perpendicular to the element to be focused to a single point. However, only an annular ring of this holographic optical element is required to cause a collimated optical data signal transmitted by a rotating transmitter along a path perpendicular to the element, to be focused to a single point (receiver) on a stationary member. The width of the annular ring need only be equal to the width of the collimated radiation beam impinging on it. Thus, a plurality of optical signal data channels may be provided by assembling a plurality of concentric annular holographic optical elements in a plane. Each such holographic element has a different radius and focuses an optical data signal to a different point in space which is off of the central axis of the annular holographic optical element. By using optical techniques, the individual data channels can have an extremely high bandwidth. The optical element is small, light-weight and occupies little volume. Preferably the element is substantially planar though not limited to this. Moreover, crosstalk between adjacent channels is substantially eliminated.

Referring now to FIG. 1B, there is shown another embodiment of the present invention. As shown, optical data signal transmitter 32, mounted on stationary member 34, transmits an optical data signal along a path 36 which is perpendicular to rotating optical coupling element 38. Element 38 comprises an annular ring (preferably a holographic optical element) which focuses optical data signal 36 along a path 40 to optical data signal receiver 42 mounted on rotating member 44. Element 38 and receiver 42 are rotated in synchronism about rotational axis 46. Optical coupling element 38 has a central axis which is coincident with rotational axis 46. Receiver 42 and transmitter 32 are spaced from rotational axis 32, so that optical coupling element 38 focuses perpendicular radiation impinging on it to a point (receiver 42) which is off of axis 46.

It will be understood that the radiation transmitted by an optical data transmitter is not necessarily parallel to the axis of rotation and does not necessarily impinge a perpendicularly on the optical element. It is only necessary that the radiation impinge on the optical element at every point of its movement about the axis of rotation. Moreover, the optical element may have a configuration other than annular and other than planar.

Referring now to FIGS. 2-5, there is shown another embodiment of the present invention, as incorporated in a rotary magnetic head scanner of a helical scan magnetic tape recorder. As shown, rotary head scanner 48 includes upper and lower stationary drums 50 and 52, and a rotating head wheel 54 upon which are mounted a plurality of magnetic heads, such as, heads 56 and 58. Scanner 48 is mounted in a helical scan, magnetic tape recording/reproducing apparatus, in which a magnetic tape 60 is transported between supply and take-up reels (not shown) around scanner 48. Tape 60 is wrapped around scanner 48 in a helical path so that as head wheel 54 rotates, record/reproduce heads 56 and 58 record to and reproduce from slant tracks on tape 60. Head wheel 54 is rotatably mounted on a shaft 62 which is rotated by head wheel drive circuit 64. Circuit 64 includes a motor (not shown) mechanically linked to shaft 62 and also includes a tachometer (not shown) which is linked to shaft 62 to provide speed and phase control signals to control the rotational speed and phase of the motor.

According to the present invention, record and reproduce signals are optically coupled between rotary record/reproduce circuit 66 and stationary record/reproduce circuit 68 by means of an optical data signal apparatus. Such apparatus includes rotating assembly 70 mounted on head wheel 54 and stationary assembly 72 mounted on stationary drum 52. The optical data signal apparatus of the invention is capable of transmitting far greater bandwidth and higher frequency signals between the stationary and rotating members of scanner 48 than is possible with conventional rotary signal transformers. Thus, whereas the upper frequency of a rotary transformer is limited to less than 200 megahartz, optical signals may be transmitted in the several gigahartz range. Optical signal transmission provides excellent signal to noise ratio; minimizes signal degradation during transmission; and eliminates electromagnetic and radio frequency interference from external and internal sources. Moreover, by providing a separate optical coupling link for each record and reproduce channel, crosstalk between channels is virtually eliminated. The optical data signal apparatus of the invention is simple in design and construction, light-weight, inexpensive and may be manufactured at low cost, by well-known mass production manufacturing techniques due to less severe dimensional tolerances than rotary transformers.

Figure 2:
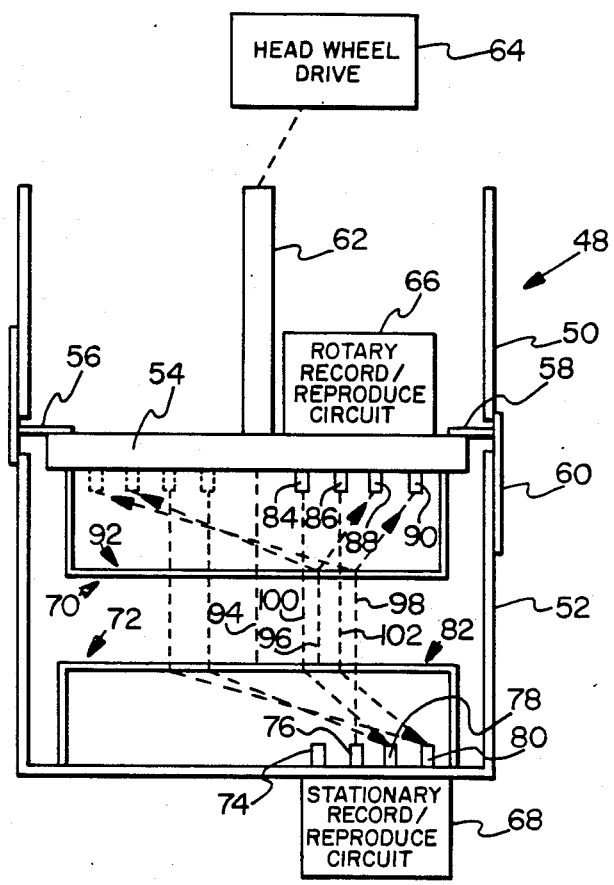
FIG. 2 is a diagrammatic elevational view of a multichannel embodiment of the present invention.

Referring to FIG. 2, stationary assembly 72 includes first and second stationary optical data signal transmitters 74 and 76 and first and second stationary optical data signal receivers 78 and 80. Assembly 72 also includes stationary optical coupling element 82. Rotary assembly 70 includes first and second rotating optical data signal transmitters 84 and 86 and first and second rotating optical data signal receivers 88 and 90. Rotating assembly 70 also includes a rotating optical coupling assembly 92.

Rotating transmitters 84 and 86 are radially spaced from rotational axis 94 of head wheel 54. Stationary transmitters 74 and 76 are also radially spaced from axis 94, but at different radial distances than transmitters 84 and 86. This staggered spacing assures that collimated optical data signals 96 and 98 from stationary transmitters 74 and 76, respectively, do not interfere with collimated optical data signals 100 and 102 transmitted by rotating transmitters 84 and 86. Thus, there is substantially no crosstalk between adjacent channels and bidirectional communications may be effected between the rotating and stationary systems of rotary scanner 48.

Figure 3:
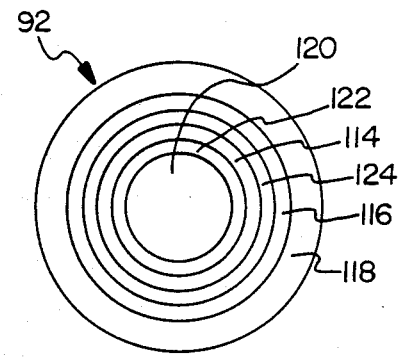
FIGS. 3 and 4 are respectively plan views of the optical coupling elements of the apparatus of FIG. 2.
Figure 4:
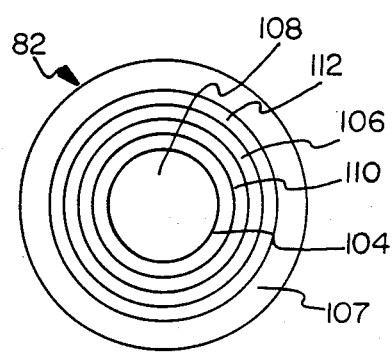
Figure 5:
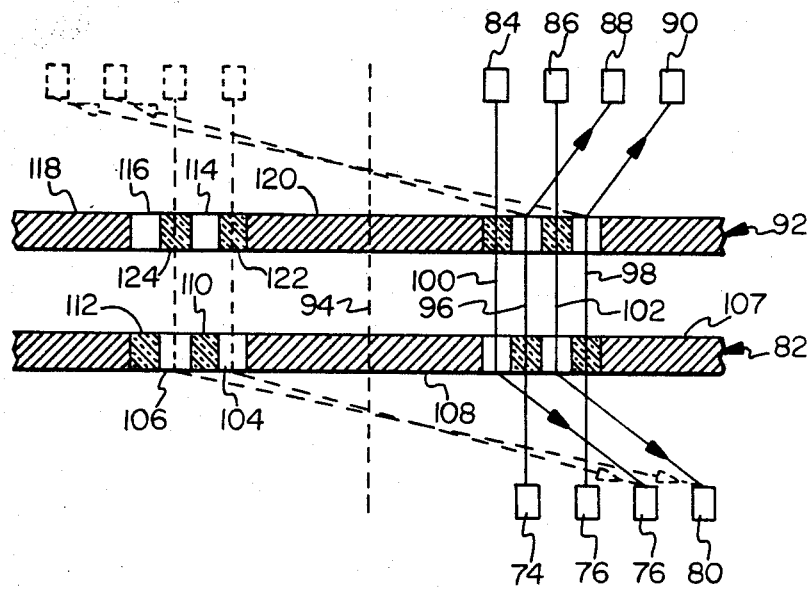
FIG. 5 is a diagrammatic elevational view which is useful in explaining the operation of the embodiment of FIG. 2.

Referring now to FIGS. 3-5, the construction and operation of assembly 70 and assembly 72 will be described in greater detail. As shown, stationary optical coupling assembly 82 includes substantially planar, annular coupling elements 104 and 106 which are concentric about central axes which coincide with rotational axis 94 of head wheel 54. Assembly 82 also has opaque areas 107 and 108 and transparent annular rings 110 and 112. Rotating optical coupling assembly 92 includes substantially planar, annular optical coupling elements 114 and 116 having central axes which are coincident with the rotational axis 94. Elements 114 and 116 are concentric and rotatable about axis 94. Assembly 92 also includes opaque regions 118 and 120 and optically transparent annular rings 122 and 124.

Assemblies 82 and 92 are parallel to each other and perpendicular to axis 94. Transparent rings 122 and 124 of assembly 92 are axially aligned with optical coupling rings 104 and 106, respectively, of assembly 82. Thus, collimated optical data signals transmitted by rotating transmitters 84 and 86, will pass through rings 122 and 124 and imprings perpendicularly on optical coupling elements 104 and 106. Optical element rings 104 and 106 cause the optical data signals to be focused to stationary optical data signal receivers 78 and 80. Similarly, the optically transparent rings 110 and 112 of stationary assembly 82 are axially aligned with optical coupling elements 114 and 116 of rotating assembly 92. Thus, collimated optical data signals transmitted by stationary transmitters 74 and 76, will pass through rings 110 and 112 and impinge perpendicularly on optical coupling elements 114 and 116. Elements 114 and 116 cause the data signals to be focused to rotating optical data signal receivers 88 and 90.

Preferably optical coupling elements 114 and 116 and 104 and 106 are holographic optical elements. Although the optical data signals transmitted by transmitters 74 and 76 and 84 and 86 may comprise a single signal, it will be appreciated that such signals may be multiplexed according to well known multiplexing techniques, so that a plurality of signals may be transmitted over a single channel. Thus, time-division multiplexing, frequency division multiplexing and radiation-wave division multiplexing may be utilized to increase the number of separate signals transmitted over a single channel to and from head wheel 54. It will also be appreciated that although the apparatus of FIG. 2 is described as having two sending and two receiving channels, any number of optical data signal channels may be between the stationary and rotating systems of rotary scanner 48.

The invention has been described in detail with particular reference to preferred embodiments thereof, but it will be understood that variations and modifications can be effected within the spirit and scope of the invention.

What is claimed is:

1. Optical data signal apparatus comprising:
an optical data signal transmitter, an optical data signal receiver, and means for mounting said transmitter and said receiver for relative rotation with respect to one another about a rotational axis in a plane which is perpendicular to said rotational axis, wherein said transmitter and said receiver are axially spaced from one another and each of which is radially spaced from said axis; and
an annular, substantially planar, optical coupling element which has a central axis coincident with said rotational axis, which is spaced from and located between said transmitter and receiver and which causes a collimated optical data signal, which is transmitted by said transmitter along a path perpendicular to said element, to be focused along a path to said receiver.

2. The apparatus of claim 1 wherein said receiver is stationary;
wherein said transmitter rotates about said rotational axis; and
wherein said optical element is stationary and focuses an optical data signal transmitted by said rotating transmitter to said stationary receiver.

3. The apparatus of claim 1 wherein said transmitter is stationary;
wherein said receiver rotates about said rotational axis; and
wherein said optical element rotates about said rotational axis in synchronism with said receiver and focuses an optical data signal transmitted by said stationary transmitter to said rotating receiver.

4. The apparatus of claim 1 wherein said optical element is an annular holographic optical element which has a central axis coincident with said rotational axis and which causes a perpendicular collimated optical data signal to be focued to a single area which is off said axis and at which said receiver is located.

5. Optical data signal apparatus comprising:
a stationary member which has a central axis and which mounts a stationary optical data signal transmitter and a stationary optical data signal receiver, each of which is radially spaced from said central axis;
a rotating member which is spaced from and which rotates about a rotational axis coincident with said central axis of said stationary member; wherein said rotating member mounts a rotating optical data signal transmitter and a rotating optical data signal receiver, each of which is radially spaced from said rotational axis;
a stationary, annular, substantially planar, optical coupling element located between said stationary and said rotating members and a rotating, annular, substantially planar, optical coupling element, located between said stationary and said rotating members, each of which has a central axis which is coincident with said rotational axis, and is spaced at a different radial distance from said rotational axis;
wherein said stationary optical coupling element causes a collimated optical data signal transmitted by said rotating optical data signal transmitter to be focused to said stationary optical data signal receiver; and
wherein said rotating optical coupling element causes a, collimated optical data signal transmitted by said stationary optical data signal transmitter to be focused to said rotating optical data signal receiver.

6. The apparatus of claim 5 wherein said optical elements are respectively holographic optical elements.

7. Optical data signal apparatus comprising:
a stationary member which has a central axis and which mounts first and second stationary, optical data signal transmitters radially spaced from said central axis and first and second stationary, optical data signal receivers radially spaced from said central axis;
a rotating member which is spaced from said stationary member and which rotates about a rotational axis coincident with said central axis of said stationary member wherein said rotating member mounts first and second rotating, optical data signal transmitters radially spaced from said rotational axis and first and second rotating, optical data signal receivers radially spaced from said rotational axis;
a stationary optical coupling assembly, located between said stationary and rotating members, which has first and second, concentric, annular, stationary optical coupling elements and which has a central axis which is coincident with said rotational axis, wherein said coupling elements are disposed in a plane perpendicular to said rotational axis;
a rotating optical coupling assembly, located between said stationary and rotating members, (1) which has first and second, concentric, annular, optical coupling elements which rotate in a plane perpendicular to said rotational axis, and (2) which has a central axis which is coincident with said rotational axis; said annular elements of said rotating assembly being radially spaced from said rotational axis at different distances than said annular elements of said stationary assembly;
wherein said first and second optical coupling elements of said stationary optical coupling assembly cause perpendicular, collimated optical data signals transmitted by said first and second rotating optical data signal transmitters to be respectively focused on said first and second stationary optical data signal receivers; and wherein said first and second optical coupling elements of said rotating optical coupling assembly cause perpendicular, collimated optical data signals transmitted by said first and second stationary optical data signal transmitters to be respectively focused on said first and second rotating optical data signal receivers.

8. The apparatus of claim 7 wherein said rotating member is a rotating head wheel of a rotary magnetic head scanner having a plurality of magnetic record/reproduce heads; and wherein said rotating transmitters and receivers are mounted on said head wheel and are electrically connected to said plurality of magnetic record/reproduce heads.

* * * * *